A. J. TANNER.
TICKET SYSTEM AND MEANS THEREFOR.
APPLICATION FILED AUG. 15, 1919.

1,413,631. Patented Apr. 25, 1922.
6 SHEETS—SHEET 2.

INVENTOR
Arnold J. Tanner

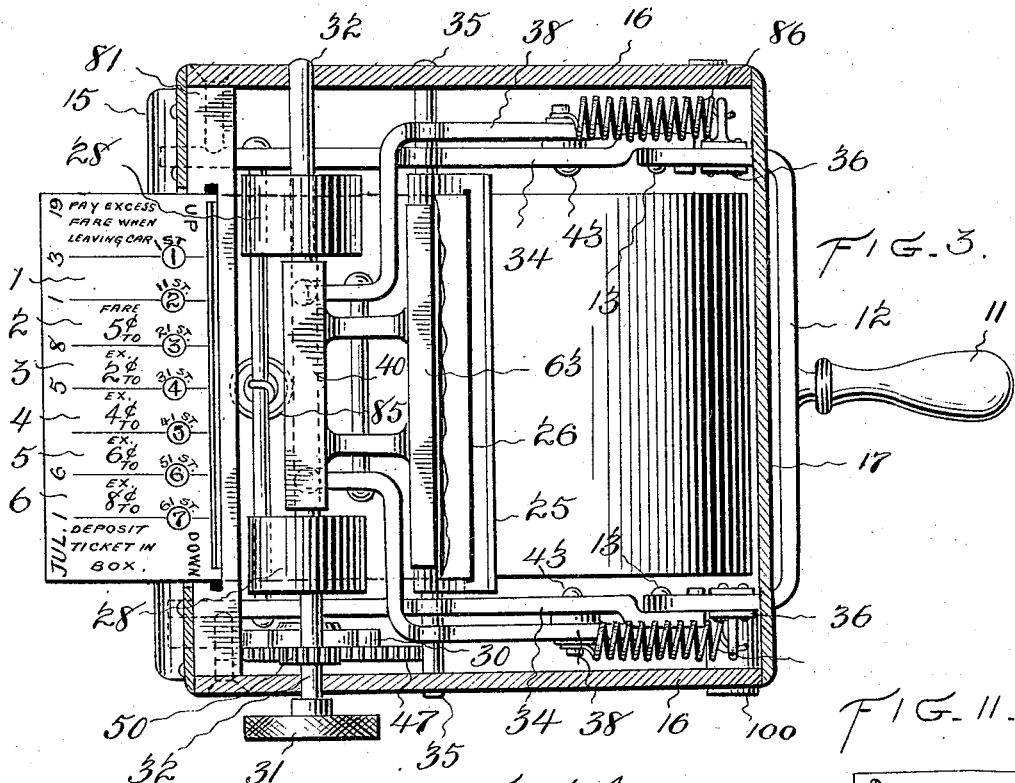

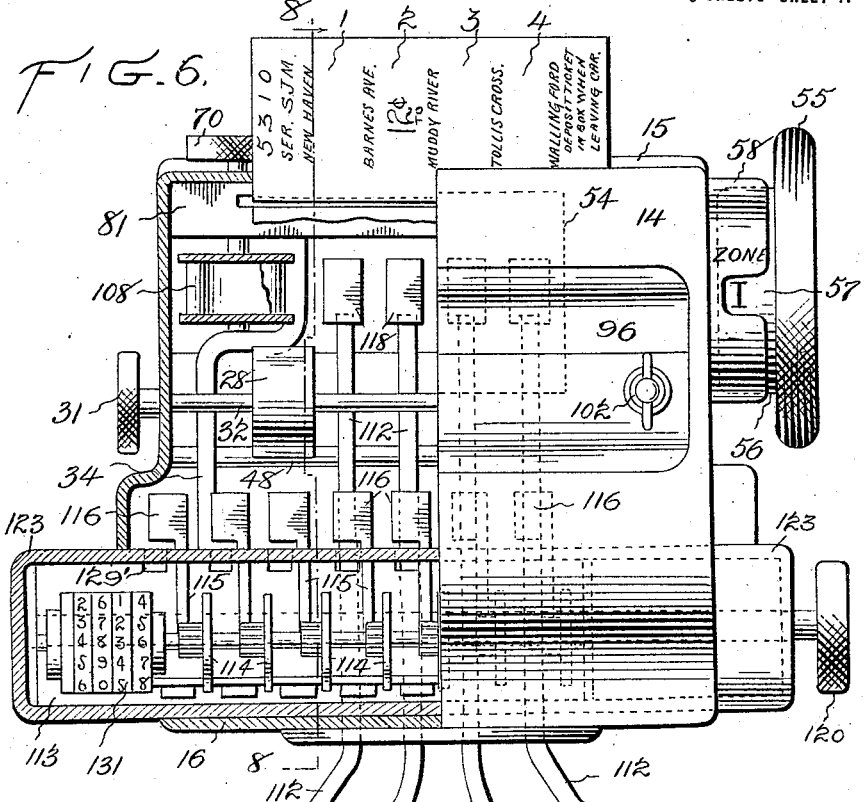
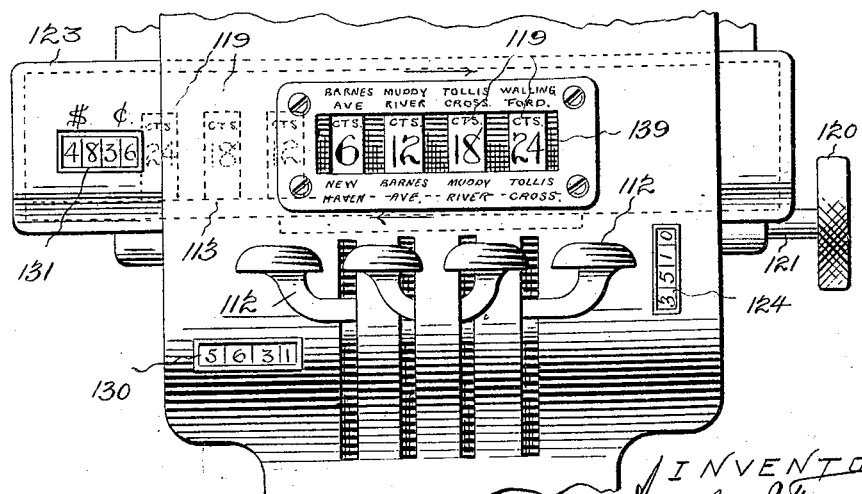

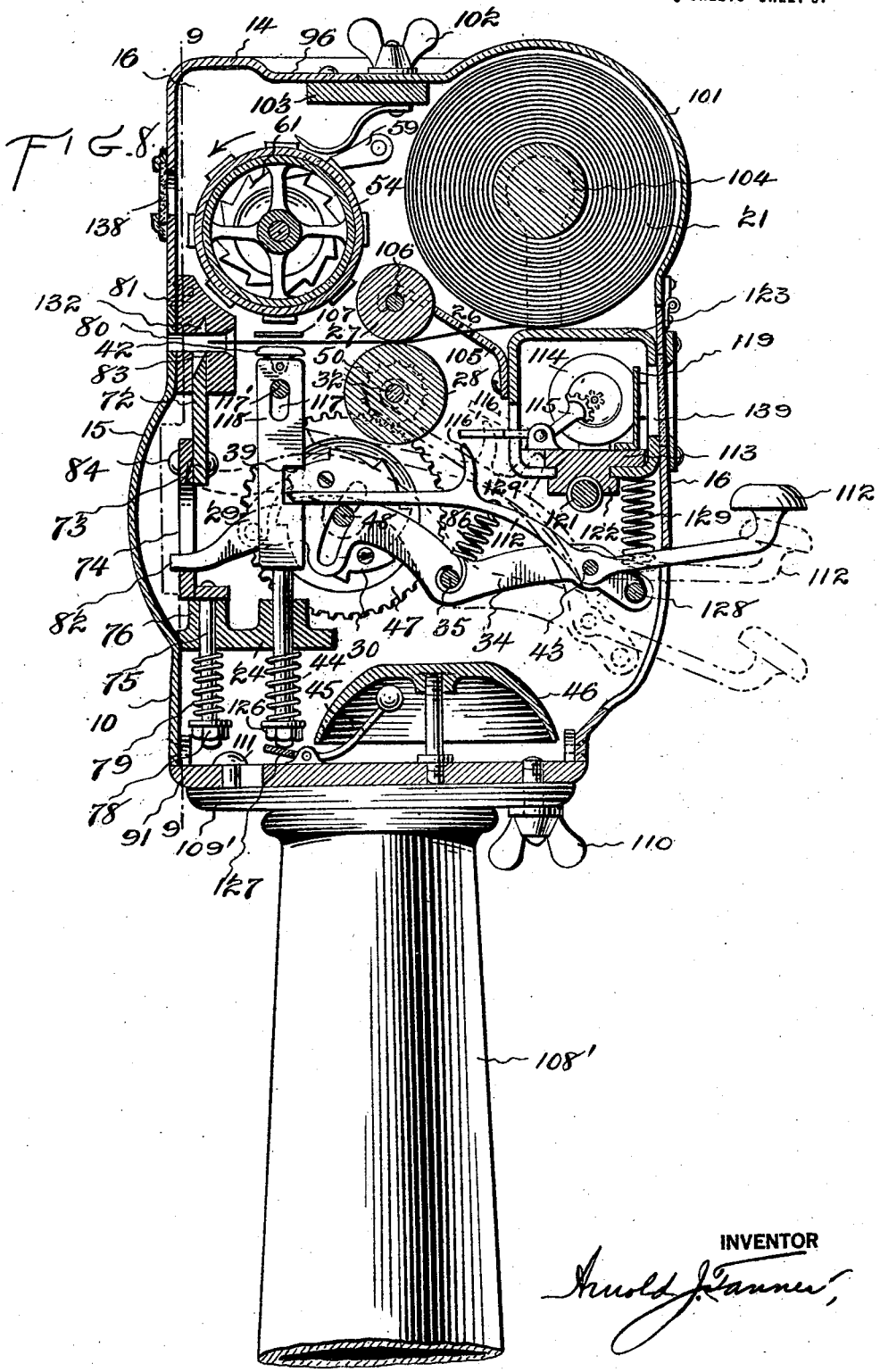

A. J. TANNER.
TICKET SYSTEM AND MEANS THEREFOR.
APPLICATION FILED AUG. 15, 1919.
1,413,631.
Patented Apr. 25, 1922.
6 SHEETS—SHEET 6.
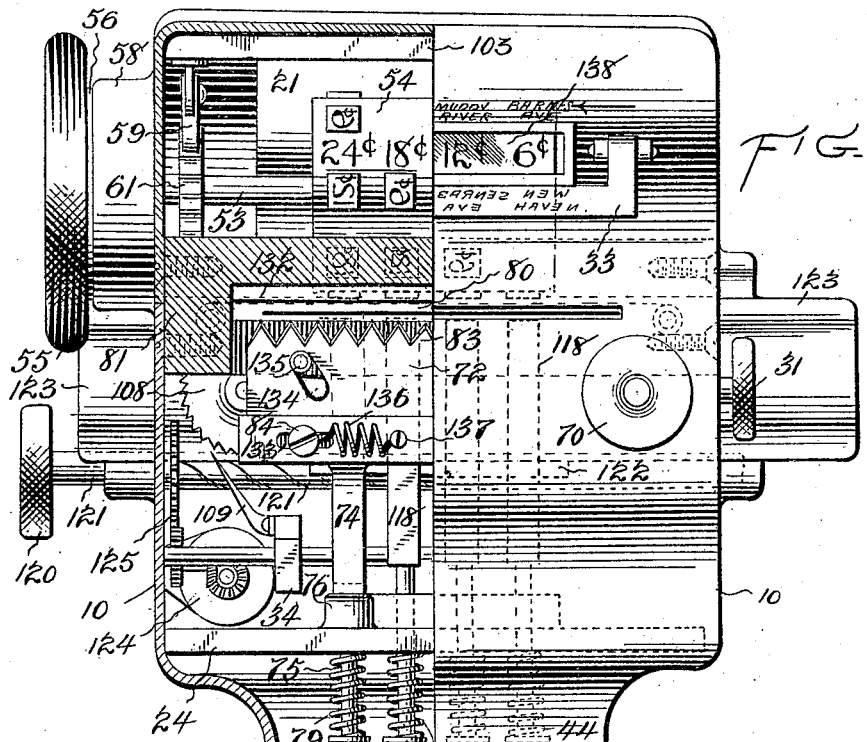
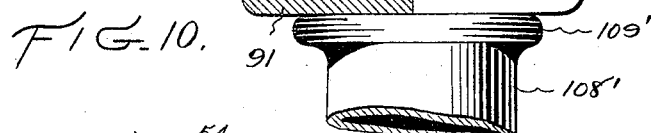
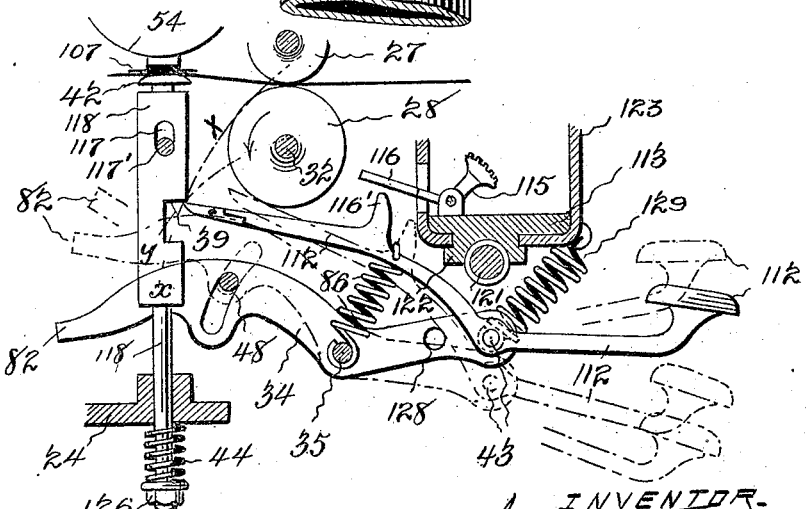
INVENTOR.
Arnold J. Tanner.

UNITED STATES PATENT OFFICE.

ARNOLD J. TANNER, OF NORTH HAVEN, CONNECTICUT, ASSIGNOR TO JOHNSON FARE BOX COMPANY, OF CHICAGO, ILLINOIS, A CORPORATION OF NEW YORK.

TICKET SYSTEM AND MEANS THEREFOR.

1,413,631.

Specification of Letters Patent. Patented Apr. 25, 1922.

Application filed August 15, 1919. Serial No. 317,663.

*To all whom it may concern:*

Be it known that I, ARNOLD J. TANNER, a citizen of the United States, and resident of North Haven, in the county of New Haven and State of Connecticut, have invented certain new and useful Improvements in Ticket Systems and Means Therefor, of which the following is a specification.

The present invention relates to ticket systems and consists of improved means for producing tickets having individual differentiating characteristics and is especially useful for railway and like passenger service wherein zone or stage fares of various denominations are assessed according to the distance travelled by the passenger.

The machine proposed according to this invention has distinctive characteristics differentiating it from ticket machines heretofore proposed in that it can be successfully employed on a vehicle, while in transit, by selectively setting the machine relatively to the particular zone, in which the vehicle is travelling, and then by non-selective operation of a member of the machine, uniform tickets bearing determined indications are issued.

In practice with passenger service systems, as applied to railways, omnibuses and the like, fares are more desirably collected either by prepayment or post-payment, respectively when the passenger is entering or leaving the vehicle. The operator whose duty it is to attend to the collection and checking of fares, is permanently stationed at a fixed collection point, usually on the platform of the vehicle.

Passengers boarding and leaving the vehicle at different fare points create variable conditions respecting the fare to be paid, consequently with a fairly complicated system, having a considerable number of fare points, amongst other faults, the operator is liable to make errors, particularly as regards the amount of the fare. The primary object of this invention is to remove the tendency to err by eliminating the human element in the assessment of the fares and for this purpose the improved machine is provided with automatic means which are set mechanically and successively at the time when the vehicle reaches different fare points and whereby the operation of the machine to issue a ticket for the correct fare value, becomes purely mechanical, that is, the operation thereof is non-selective for herein a regular operation of a single operating member will issue uniform tickets according to the permanent setting of the machine for each fare stage or zone.

At congested points, speed is particularly essential, therefore elimination of calculation on the part of the operator is an important consideration. To permit speeded operation, with natural attendant hard usage, the improved machine is made simple and durable of construction, rapid in operation and even though the operator employs excessive force, when working under pressure, the machine will remain in perfect working order. The improved means are efficient in operation and flexible in application so as to meet different conditions. The bulk of the machine is also a factor to be considered because available space on a passenger vehicle is necessarily restricted. The improved machine is accordingly especially designed to be compact in form, of as few parts as possible, which latter feature offers the further advantage that it renders the machine easy to assemble and readily accessible.

The tickets issued from the improved machine provide ready and positive means for determining and indicating the amount of the fare paid or to be paid from any fare point or between any two points, and by means of the tickets issued, checked with recording means of the machine, or other means, a complete and precise record of the money or other value receipts may be easily ascertained.

The salient features of the invention, amongst others hereinafter particularly described are—firstly, the ticket having a plurality of defined divisions or blank spaces representing zones, or distances between fare points provided thereon in preparation to receive a designating character or sign in a selected position or order so as to indicate a determined fare value or value between selected points; secondly, a movable member of the machine having a plurality of printing characters or devices arranged thereon in a manner whereby through successive setting of said member, any one, two or more of said printing characters are successively brought into a predetermined printing position relatively to said divisions or blank spaces on the ticket; thirdly, the machine is provided with operating means comprising a main lever or member carrying or having associated therewith one or more secondary or subsidiary levers or members capable of independent initial operation relatively to said main member whereby the initial operation of said operating means will first effect printing of the ticket and give an audible signal of that operation and subsequently the main and secondary member or members will move as one united member and in proper sequence effect feeding and severing of the ticket; and fourthly, the machine is provided with recording means when employing a plurality of secondary levers, each lever operating in unchangeable relation with a device or devices effecting printing in one particular space or division on the ticket; said recording means comprising a plurality of separately actuatable counters, representing different value denominations, and which counters are capable of being set in determined and successive operative relation with said secondary levers whereby different determined valuations may be recorded by each of said secondary levers.

In carrying out the principles of the invention above referred to, various improved details of construction and arrangement of parts are introduced. Such details also form part of the present invention and the same together with the main features of the invention will be fully described hereinafter with reference to the accompanying drawings illustrating different embodiments of the invention and in which drawings—

Figure 3 is a plan view in section taken on line 3—3 of Figure 2;

Figures 4 and 5 illustrate diagrammatically a method of arranging the type on a printing drum used with the improved machine;

Figure 6 is a plan view partly in section illustrating a form of machine more suitable for a pre-payment fare collection system;

Figure 7 is a rear elevation showing part of the machine;

Figure 8 is a vertical section taken on line 8—8 of Figure 6;

Figure 9 is a front elevation partly in section taken on line 9—9 of Figure 8,

Figure 10 is a detail fragmentary view illustrating a modified form of mechanism for operating the printing device and also showing its relation to the recording means, and Figure 11 shows a specimen ticket whereon all printed matter is imprinted by the machine using a blank ticket strip.

Figure 1:
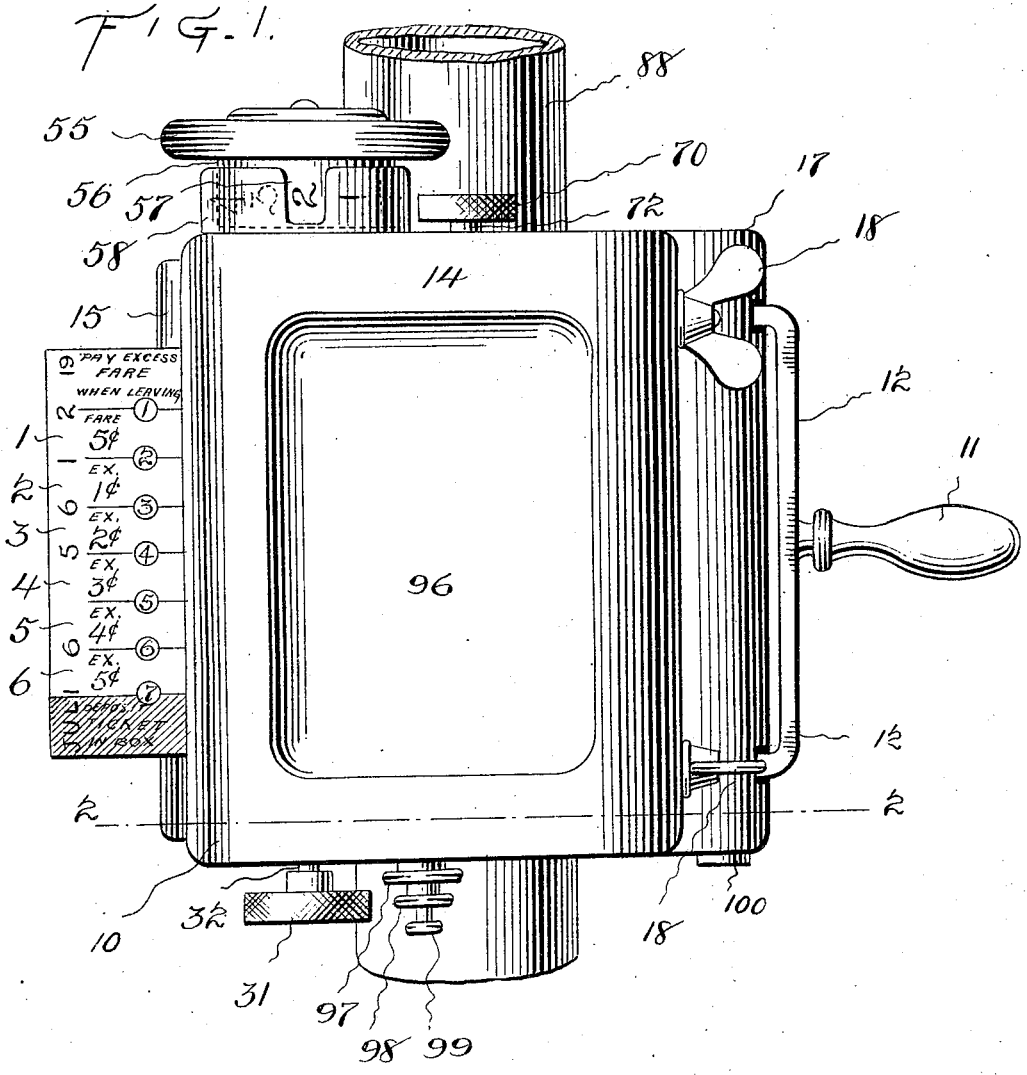
Figure 1 is a plan view of one form of the improved machine, more suitable for a post-payment fare collection system.
Figure 2:
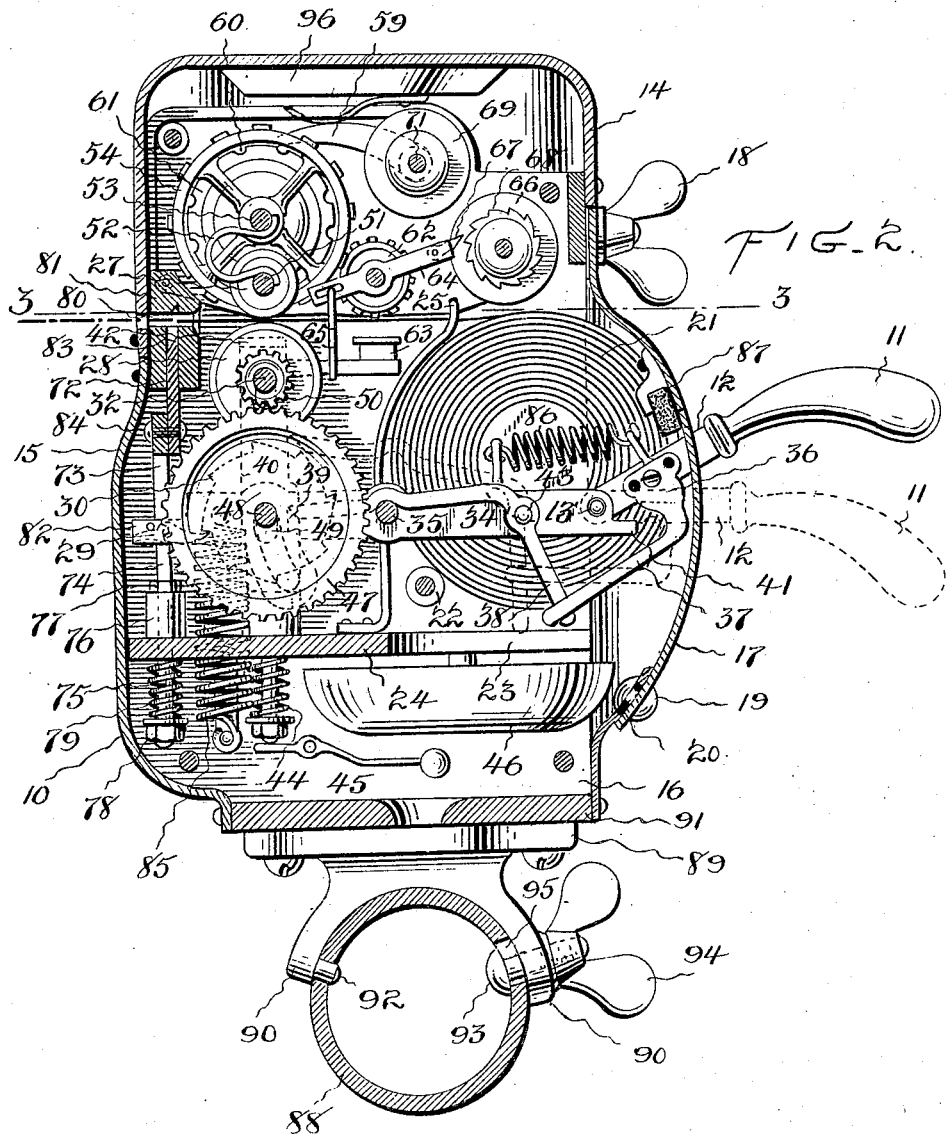
Figure 2 is a vertical section taken on line 2—2 of Figure 1.

Referring to the accompanying drawings, more particularly Figures 1, 2 and 3, wherein 10, represents a casing enclosing the working parts of the machine with the exception of the external handle, 11, secured to the bifurcated primary operating lever 12 which is pivotally jointed at 13.

The casing is composed of top section 14, front plate 15, side plates 16 and a back plate 17, which latter plate is retained in place by thumb nuts 18 and devices 19 interlocking in key-hole slots 20, and through the use of such fastening devices, the back plate 17 is removable for the purpose of inserting, when required, a fresh roll 21, containing strip tickets. This roll is preferably contained within the casing between two arms of the main lever 12. The roll 21 rests on the roller 22 above the opening 23 in the plate 24. Said opening being provided so that when the diameter of the roller is reduced to a certain size warning is given of the fact, when the roller falls through said opening and comes in contact with a bell so as to muffle the sound thereof. The lever arms, roller 22 and spring plate 25 tend to hold the roll 21 in place without bearings, and the ticket strip from said roll, passes through guide slot 26 in said plate 25, and by this guiding means straight travel of the ticket strip between feed rollers 27 and 28 is ensured.

Having in mind the necessity of providing means for readily replenishing the supply of tickets, the said back plate is bodily removable so as to provide a large opening through which a new roll of tickets may be inserted and the end of the strip easily threaded through the guide slot 26 and between the feed rollers 27 and 28. When the new roll is inserted the operating lever 12 may be in its down position and when occupying this position the feeding mechanism, comprising the pawl 29 and ratchet toothed wheel 30 are disengaged, then, by means of knob 31, shaft 32, on which feed rollers 28 are mounted, can be rotated to feed the ticket strip through the machine without printing or issuing a ticket. By this same means any irregularity in the feed of the tickets may be corrected by advancing or retracting the ticket strip to bring the permanent printed matter on the strip in proper position with relation to the matter printed by the machine on each ticket as issued. Each operation of the handle 11 in one direction positively operates the printing, feeding and severing of a ticket in proper sequence. First of all the handle 11 and arms 12 are depressed on their pivotal bearing 13, independently of the levers 34 which are pivotally mounted on shaft 35. A plate 36 having extensions or arms 37, is secured to each lever 34 and the arms 37 engage bell-crank levers 38 which are pivotally mounted on the levers 34. The free ends of the levers 38 engage their respective notches 39 in vertically sliding plunger platens 40. During the downward movement of the handle 11, until the arms 12 engage the shoulders 41 of the levers 34, the bell-crank levers 38 will be operated by the arms 37 and resulting from this operation the plunger platen 40 is raised with a quick action to effect printing by means of the printing head 42 being brought into contact with the printing type or character in alignment therewith. Continued movement of said bell crank levers is not arrested during the period the handle 11, arms 12 and 37 move independently of the levers 34, and it should be noted, the movement of said bell crank levers is then about the pivotal point 43. After printing is effected the bell crank levers continue to advance so as to release the platen 40 which is returned to its normal position by a quick action imparted by spring 44. This quick action is utilized to actuate bell crank lever 45 which effects ringing of the bell 46. It should also be noted here that thus, with each printing action, which denotes issue of a proper ticket, an audible signal is given.

Further depression of the handle 11 causes engagement of the arms 12 with levers 34 and then the said handle, arms, levers and also the bell crank levers 38, move as one unit about the pivotal point 35.

Final downward movement of the handle 11 brings the ticket feeding mechanism into action at the proper time after printing is effected. This feeding mechanism comprises the pawl or dog 29 engaging one of the teeth of ratchet wheel 30; the latter being secured to gear wheel 47 mounted on shaft 48, which latter shaft passes through the platen 40 and serves as a guide therefor, vertical movement of said platen relatively to said shaft being limited by a slot 49 in said platen.

The driving gear wheel 47 meshes with gear 50 fixedly mounted on shaft 32 which also passes through platen 40. The ratio of the gear wheels 47 and 50 is in accordance with the diameter of the feed roller 28 and the width of the ticket to be issued, the dimension of all of said members being so calculated that turning of the ratchet wheel is in an arc determined by engagement of the dog 29 with one tooth of the ratchet 30. This ensures uniformity in the feed and discontinuance of the same when the severing of the ticket takes place, consequently buckling of the ticket-strip or another disadvantage cannot occur.

The idler feed rollers 27 are mounted on stud shafts 51 and a flat spring 52 is sprung between each shaft 51 and shaft 53 on which printing drum 54 is mounted. The purpose of said spring 52 is to impart spring tension to the contact of the feed rollers 27 with roller 28.

The printing drum 54 rotates with the shaft 53 which is turned intermittently by means of knob 55, to set the selected printing type in alignment with the platen or printing head 42. A hub or cylindrical portion 56 of the knob 55 bears indicating characters thereon representing zones or fare points and these characters are arranged in proper order relatively to the arrangement of the printing type in the drum, so that, for example, the numeral 2, exposed through the opening 57 in the cover 58 indicates that the next fare point will be No. 2, which also shows that the vehicle is travelling in the first zone. With this setting of the indicating device, operation of the machine will issue a ticket with printing matter thereon as illustrated; for example, in Figures 1 or 2.

An example of one method of carrying out the principle involved in the arrangement of the printing characters or type is illustrated in Figures 4 and 5 and it is to be noted the illustrative example is designed for a route having seven fare points or six zones, and one scale of charges, five cents for the first two zones and two cents for each zone thereafter. It will be assumed the vehicle is travelling in the first zone between points 1 and 2 and the machine shown in Figure 2 is set accordingly. Agreeing with the reading of the indicator, group, column or row $a$ of type drum 54 is in position for service and consequently each division or blank space of the ticket, representing zones, has a fare value printed therein except the first zone which, in this particular instance, is covered by the payment of the standing or initial fare. When the vehicle arrives at point 3 the operator advances the drum one point and this operation is guided by engagement of the detent 59 in the next notch 60 of the detent wheel 61. Then type row $b$ is in position for service and so on, each row of printing type is brought into position for service as the vehicle progresses in its journey from point to point, the fare values being retrogressively reduced both in number and value until for the last zone one character alone is in a position for printing. An additional column may be added for the purpose of issuing a ticket which will serve as a transfer.

On the return journey of the vehicle the drum is intermittently rotated from point to point precisely in the same manner and in the same direction as before, only columns $a'$ to $f'$ of another division of the drum, having the type reversed, are progressively brought into service. When the vehicle, again reaches the starting point No. 1, the printing drum will have made one complete rotation on its axis, and is then in proper position for the next trip.

A consecutive numbering and dating device and printing means are employed and the same may be of any suitable and known form having a train of number wheels which are automatically advanced at each operation, and also dating wheels are provided which may be changed as required. The numbering device 62 has an impression taken therefrom on each ticket by means of an extension 63 of the platen 40 but desirably the print is taken on the ticket next in line to the one being issued so that a record may be kept of the number of tickets issued during a given time.

Each operation of printing a ticket advances the numbering device by means of rocking arm 64 which receives motion through the link connection 65 from the receding movement of the platen extension 63. The arm 64 also causes rotation of the ribbon drum 66 through engagement of the dog 67 with the teeth of ratchet 68 secured to said drum 66. The printing ribbon is taken from drum 69 and for the purpose of rewinding the ribbon on the drum 69, external knob 70 is provided on the end of the shaft 71 on which drum 69 is mounted.

The ticket severing device consists of the knife blade 72 and carrier plate 73, which latter plate has legs 74 terminating as rods 75 having a sliding bearing in bosses 76 in the plate 24. Nuts 77 and 78 are provided respectively for adjusting the cutting device and for regulating the tension of the spring 79 which returns the knife blade carrier to the normal or down position, whereby the opening 80 through the cross member 81 is left clear for the passage of the ticket. The extremities 82 of the levers 34, engage the carrier 73 after the ticket feeding action is completed. The cutting edge 83 of the knife is preferably serrated and to give a shearing cut the knife blade is given an oscillatory motion by the pins or rivets 84.

When the ticket is severed, the operator relaxes pressure on the handle 11 thereby allowing spring 85 to return the levers 34 to their normal or down position, and also by this action, permitting the spring 86 to bring the handle arms 12 and bell crank levers 38 to their normal position. The spring 86, at the end of the return movement of the entire operating means after the same ceases to move as one unit, acts against the handle 12 to give a cushioning effect alone or in conjunction with the cushion 87. By this means, even if the operator suddenly releases the handle, the latter and its associated members, will not return with a snap so as to unduly jar the machine and cause undesirable results both as regards the operation of the machine and its wear.

The machine may be mounted on any suitable base, but desirably when used on a vehicle having a rail such as 88, applied to define ingress and egress passages for the passengers, the machine is detachably mounted on such a rail. The particular means for attachment, shown in Figure 2, comprises a base 89 having lugs 90, and said base being permanently secured to the base plate 91 of the machine. One of the lugs 90 carries a pin 92 which engages a hole in the rail 88. The other lug carries a bolt 93 and winged nut 94 and which attachment, when the nut 94 is loosened, permits the bolt to be pulled through the key hole slot 95. This means of attachment facilitates removal of the machine to different points of the vehicle.

The top surface of the cover 14 is depressed to form a till 96 and projecting from the side plate 13 are turning buttons 97—98 and 99 whereby the date printed on the ticket may be conveniently changed. 100 represents a lock by means of which the operating levers and associated parts may be locked when desired.

The embodiment of the invention hereinbefore described is adapted for a post-payment of the fare and in which case it is required that the ticket should serve as means for indicating the fare the passenger has to pay when he is about to leave the car. According to the arrangement, one, two or more of the printing type are brought into service by the initial movement in the operation of issuing the ticket. The fare amount for all untraversed zones will be indicated on each ticket and assessed from the zone in which the ticket is delivered in a manner so as to be readable by the holder of the ticket, as well as by the operator.

Figures 6, 7, 8, 9, and 10 illustrate another embodiment of the invention as applied to a machine useful for a prepayment fare system, in which case the passenger pays the fare when entering the car. The principles involved in the first described embodiment are all found in the present embodiment and a number of parts, bearing the same reference characters are substantially alike. The machine, though, differs primarily in that therein the printing type are separately and individually brought into service, and besides counting the total number of operations by means of the ticket consecutive numbering devices, hereinbefore referred to, a registration indicating separate determined values is recorded by means of a series of counters. For instance, with the ticket illustrated in Figure 11, one counter will always indicate the multiple of 6¢ value tickets issued, another 12¢ tickets, the third 18¢ tickets and the other 24¢ tickets. These counters are fixedly mounted on a common sliding carrier which may be moved on its base in selective order relatively to a plurality of printing keys whereby any one key representing a determined value, for the time being, may be operated by selection to print a ticket with the proper destination indication and value receipt thereon, and the operation of any one of said keys will effect issue of a ticket in the manner aforesaid and effect a recording indication of the value of the ticket issued.

In this alternative form of the machine, a suitable casing is provided but in the present instance, for the reason that the construction will not permit of the ticket roll 21 being carried between the operating levers 34, therefore, the roll is mounted higher up within the casing, under the hinged cover 101, which is held in a closed position by a fastening device 102 carried by the cross member 103. Spring clips 104 (shown on dotted lines,) provide a bearing for the roll and the ticket strip is guided through an opening 26 in spring plate 105 which plate bears and imparts tension on continuous shaft 106 having mounted thereon idler feed roller or rollers 27. The detent wheel 61 has ratchet teeth engaged by the pawl 59 in a manner so that the printing drum 54 can be rotated in one direction only, as indicated by the arrow, and this limitation will prevent the operator from turning the drum backwards for any purpose.

Any approved printing means such as a ribbon and suitable feeding mechanism may be employed with this or the other embodiment of the invention. With this embodiment, the ribbon 107 travels at right angles to the ticket strip, from one ribbon drum 108 to another. Rotation of one of the ribbon drums, or both, if a known form of automatic feed reversing device is employed, may be effected by means of dog 109 carried on one of the levers 34. Each operation of the levers 34 to feed a ticket, causes operation of the ribbon feeding device.

The machine is detachably mounted, as in the former instance on a suitable base, but in the latter instance the means employed consists of a pillar 108' having top plate 109' to which the bottom plate 91 of the machine is secured by nut 110 and stud 111.

The levers 34 are, in construction and general arrangement relatively to the ticket printing, feeding and severing mechanism, substantially the same as before, but instead of a single operating handle 11 a plurality of key levers 112 are employed. One key for each value and as previously explained, providing one key for each zone. The relative position of each key with its particular zone is unchangeable but the value of each key is progressively changed by the following means. A sliding carrier 113 has mounted thereon the recording counter composed of a series of counting units 114, each unit having its individual operating lever arm 115. Each lever 115 terminates in a flattened end 116 and by moving said carrier these ends are selectively and successively brought into the path of the projections 116' of which there is one on each key lever 112. A series of separately actuatable platens 118 are employed and each platen co-operates with its individual key lever 112 by engagement of the free end of the latter with the notch 39. Operation of any selected key 112 will effect printing through raising of the platen associated therewith substantially the distance allowed by slot 117', through which a common supporting rod 117 passes. The value registered by the counting mechanism depends on which arm 115 is lying in the path of the projection 116' of key operated, and the proper or agreeing value printed on the ticket depends on the correct setting of the printing drum 54.

Correct setting of the value registration and destination indication and value printed on the ticket relatively to each other and with respect to the location of the vehicle may readily be effected and ascertained by means of the indicators 138 and 139. By means of indicator 138 a reading of the relative position of the printing drum 54 is obtained. In Figure 5, the type or character of group or column $a$ are shown in position for service, and the machine is assumed to be set for operation while the vehicle is in the first zone. The space between columns $e$ and $f$ is before the opening in the indicator 138, and in said space, in proper relative order, the same values contained in column $a$ are printed in conspicuous readable type. This indicator 138 shows the fare values relatively to the destinations appearing on or exposed by the pivoted mask 33. The other indicator 139 shows the fare value which will be printed and recorded for any selected destination by operation of the respective key. Indicator 139 consists of a strip 119 bearing thereon printed matter representing fare values which are progressively and successively brought before this glazed opening of the indicator, with the movement of the sliding carrier 113.

In Figure 6 the ticket issued, is intended for a four zone route but it will be understood the operation and general arrangement is the same as with other examples of tickets, only of course there would be a key and associated recording and indicating device for each and every zone. According to this setting of the machine, the vehicle is in the first zone and key II has been operated to deliver a ticket to a passenger whose destination is within zone No. 2 and the fare paid is 12 cents. Passengers having zone No. 1, 3 or 4 as their destination would have a ticket issued to them valued respectively 6 cents, 18 cents, and 24 cents. Assuming now that the vehicle has reached zone No. 2, the operator turns knob 55 one point and numeral II will appear before the opening 57 and on indicator 138 the indicated fare value for the remaining untraversed zones Nos. 2, 3, and 4 would be respectively 6 cents, 12 cents and 18 cents. At the end of the journey, continued rotation of the drum will bring the reading in a reverse order, namely values 6 cents, 12 cents, 18 cents and 24 cents respectively for zones Nos. 4, 3, 2 and 1 and so on progressively until for the next trip the printing drum is brought into proper position, and the operation of changing carried on as before. The arrangement of the printed matter added to the ticket by the machine will indicate the direction of travel of the vehicle.

The change in the relative position of the recording means is effected by turning knob 120 to rotate worm 121, which engages a thread on the base 122 of the sliding member 113. By this means the said member is caused to slide to bring the various value recorders progressively into co-operative relation with the various keys. The movement of the sliding member is to and fro and carries duplicate recording devices, excepting the lowest or first value 6 cents, which may be used in either journey of the vehicle; therefore a duplicate of the same is unnecessary unless a separate detailed count is to be kept of traffic returns between any two fare points.

The sliding carrier 113 is enclosed within a housing 123 which may be locked to prevent unauthorized access thereto. Furthermore a record is taken of the operation of the sliding carrier, by means of the counter 124 which is connected to the worm 121 by suitable transmission means, gearing 125 for instance, in a manner that improper operation of the sliding carriers can be detected.

Each plunger platen 118 has its individual spring 44 for returning it to its normal position and the tension of said spring may be adjusted by means of nut 126. In its return movement the end of the operated platen strikes the bell crank lever 45 so as to ring the bell 46. The end of this lever, 127, is T-shaped so as to be in line to engage any one of the platens so that ringing of the bell is effected by operation of any one of the platens.

The machine is so designed that to issue a ticket one of the keys effecting printing must be operated, the only access to the operating levers 34 being through the keys. When one of the keys is depressed, this operation having caused the printing and the platen being restored to its normal position, the operated key strikes the tie rod 128 between the levers 34 and then continued depression of the key operates the levers 34 against the return springs 129, effecting the feeding of the ticket and subsequently, when feeding is completed, the severing of the ticket.

The initial movement of the operated key lever is about the pivot 43 and when the tie bar 128 is engaged the operating levers 34 and all the keys 112 move with the said levers 34 as one unit, about the pivot constituted by shaft 35. Sufficient movement is allowed the operated key lever 112 so as to give the registering counter arm 115, for the time being engaged by the projection 116 on said key, the required movement to record a count. The housing 123 it will be seen, has slots 129' cut therein to receive the projections 116' and thereby the movement of the operated keys is not arrested until the said key strikes the shaft 32.

It may not be required that the machine should consecutively number the tickets because such matter may previously have been printed on the ticket with other matter, but to retain a record of the number of tickets issued, and to facilitate counting and checking of the tickets and receipts with the number of passengers carried, a counter 130 may be provided and be operated from the levers 34. In case it is required, a total adding value device 131 is included and the same, as well as any detail adding devices employed, may, as before stated, be of any well known form, such as employed for example, with cash registers in common use and wherein motion is imparted to the index dials of the register through a shaft rotated according to the value of the key operated.

Referring to Figure 9, herein the ticket severing device is more clearly shown. The movable knife blade 72, having a saw tooth cutting edge 83, severs the ticket, but not entirely, a fractional part remaining uncut so that the ticket will not fall or be blown away before the passenger takes it. The unsevered portion of the ticket will readily tear before resistance of the ticket feed roller is overcome to permit pulling out of the strip.

The groove 132 formed in the cross piece 81 ensures a better cutting edge, and because of the length of the ticket to be cut, the cutting is effected by a shearing cut obtained by oscillatory motion of the knife blade 72 on the blade carrier (73) which latter member has a vertical movement only. The blade is allowed oscillatory movement through the connection provided by pin 84 and slot 133. The angular or cam slot 134, engaging the roller on pin 135, effects lateral movement of the knife blade and spring 136 secured at one end to the pin 84 on the knife blade and at the other end to pin 137 on the carrier, gives a quicker action to the oscillatory motion of the knife blade.

Referring to Figure 10, illustrating in a slightly modified form the working parts of the mechanism which effects operation of the printing, feeding, severing and registering devices of the machine. The operating lever 34 of which there are preferably two, one on each side of the machine to obtain a well balanced construction, is shown by full lines as being in its normal position. The type lever key 112 is shown in full lines as being in the depressed position it is in when printing is effected. This lever 112 is about to release the platen 118 which is in its raised or printing position. This key lever is moved to said full line position by turning on the pivot 43, in a path represented by line $x$. Further movement downward on the pivot 43 will first bring the inner end of the lever against feed roller 28, then continued pressure on the key creates a compoundage of the movement and leverage of the several levers. The pair of levers 34 being united together by the rod 128, they are moved as one unit about the pivot 35 in a path represented by line $y$. The end of the lever 112 bearing on the roller 28 is for the time being the fulcrum from which the mechanism operates. Pressure brought to bear on said key, when feeding is effected between the full line position and first broken line position of the lever 34, will be an advantage in that the contact of said key with the roller will act as a brake or check against spinning of the feed roller, particularly as the severing of the ticket takes place, when the end 82 of the lever 34 is in its highest position and the pawl 29 is out of engagement with the ratchet wheel 30.

The engaging end of the key 112, during the initial movement of the latter, travels in the arc of a circle having the pivot 43 as a center as before stated. During this movement the printing platen is moved upward sharply to effect a perfect print. In the returning movement, when pressure on the key is relaxed, spring 86 having a quicker action than spring 129, the operated key will return to its normal position, lying on the shaft 48 with the companion keys, which during the foregoing operation remained in this position. When in their normal position the keys all travel substantially in the arc of a circle having the pivotal point 35 as a center.

The keys are returned to their normal position by individual springs 86 and the ends of the keys readily enter into reengagement with their respective notches in the platens 118, but if required a pawl or other device to break the ends of the levers in the direction of the return movement of the key, may be employed.

Figure II illustrates a specimen ticket whereon all the printed matter is imprinted on a blank ticket strip by the machine and in which case the printing characters or marks include the fare value denominations and indication of the destinations in respect of which the fares are payable.

The operation of the improved means is simple as will be gathered, the operator need only set the machine correctly in the first instance and thereafter by a purely mechanical action on his part, readily and quickly change the registering and printing devices at each zone. With the means provided the change may be made correctly with sense of feeling only and furthermore the passenger may, by means of the indicator, readily determine for himself just what fare he must pay to any selected fare point.

It may be mentioned, the drawings herewith illustrate the machine approximately full size and this machine is adaptable for use on any route having as an example, three to eight zones and an equal number of fare values. The first embodiment described, that for a post-payment fare collection system, can be more readily adapted where different conditions exist, because herein adaptation is accomplished by merely changing the printing drum and tickets.

Naturally in instances where there is a greater number of zones a ticket of proportionately greater length must accordingly be employed, but only so as to obtain a clear reading of the printed matter thereon. In practice it may be desirable to manufacture say three standard sized machines, for example, the smallest size, for use with from three to eight zones inclusive, the next size for use with from nine to fifteen zones inclusive, and the largest size for sixteen to twenty two zones inclusive. The smallest sized machine will meet most requirements and the largest size would be for exceptional cases only.

The movable printing drum and the arrangement of the printing type or characters thereon in a manner as described herein is an important feature of this invention, and the utility thereof in computing fare values, among other things, increases with increasing number of zones. For instance, with a six zone route, for which the arrangement shown in Figure 4 is intended, there may be as many as twenty fare changes in each journey, forty changes in the entire trip. With a twelve zone route there can be seventy eight changes in each journey. Complexity increases progressively with the increase in the number of zones on account of the retrogressive reduction of the fares as the vehicle advances, consequently the operator is apt to make mistakes and the passenger is often in doubt and requires an explanation, causing a delay.

With the improved system the passenger receives a ticket when he boards the vehicle and whether or not he then makes a payment is according to the system employed. In any event, the ticket is in the possession of the passenger and the ticket is an indicator which will inform the passenger exactly what fare he must pay, the amount of which is always assessed from the point he boarded the vehicle. And, if the passenger desires to contribute towards perfecting the service, he will ascertain, by inspecting the ticket the amount of the fare payable at his destination, and he will then have the fare ready to hand the operator stationed at the pay-point.

Furthermore, the tickets provide means whereby the company's officials or inspectors may readily check the returns and detect irregularities, which supervision will cause the operator to be careful and not let discrepancies occur.

The tickets are preferably returned to the operator when the passenger leaves the vehicle and each receipt of a post-payment fare, or an excess amount of a pre-payment fare, may be recorded by means of registers or registering fare boxes now in use.

Modifications of the details of construction in the means hereinbefore described and illustrated in the drawings may readily be conceived and carried out, and it is to be understood all modifications coming fairly within the terms of the appended claims shall be covered thereby.

I claim—

1. In a stage fare ticket issuing machine, a printing device having thereon a plurality of characters arranged by groups in graded relative order whereby progressive selective setting movement of said member will successively place each of said groups separately and progressively in co-operative relation with other means associated therewith, and which latter means are capable of non-selective operation to effect printing of determined fare indicating matter on a ticket.

2. In a stage fare ticket issuing machine, a non-reversible printing member having thereon a plurality of characters arranged by groups in graded relative order to form two divisions, one division having the characters thereof in reverse order relatively to the characters of the other division.

3. In a stage fare ticket issuing machine, a non-reversible printing member having thereon a plurality of characters arranged by groups in graded relative order whereby each group may be aligned with means for obtaining successively an imprint collectively from the characters of each group.

4. A stage fare ticket issuing machine having a non-reversible drum with printing characters thereon representing variable fare values with respect to changing fare-points and arranged by groups in determined order.

5. In a ticket system for multiple stage fare collection, means comprising a printing member operative progressively in one direction only and having thereon a plurality of printing characters arranged in determined order and adapted to be used on a ticket having thereon means such as stage indications which in combination with said printing characters will indicate a selected fare-point and a determined relative fare value.

6. In a ticket system for a multiple stage fare collection system, means comprising a non-reversible progressively movable member having thereon a plurality of printing characters denoting graded valuations and aligned by groups in determined order and adapted to be used on a ticket having stage indications thereon which in conjunction with an imprint from said characters will indicate a selected destination and determined relative fare value.

7. In a ticket system for a multiple stage fare collection system, means comprising a non-reversible rotary member having two divisions, each division having in reversed relative order groups of characters denoting fare values and the characters of each group being arranged in a determined graded order so as to be retrogressively reduced both in number and value as said member is progressively rotated.

8. In a multiple stage fare ticket system, a ticket printing machine having a movable printing member arranged to be re-set at every stage point and having thereon printing characters in determined graded order representing by location fare points and their respective fare values according to the position of said printing member when the printing operation is effected.

9. In a multiple stage fare ticket system, a ticket printing machine having a progressively, non-returnable, rotating member arranged to be re-set at every stage point and having thereon printing characters in determined order representing by location fare points and their respective fare values according to the position of said printing member relatively to the ticket at the time the printing operation is effected.

10. In a ticket system for a multiple stage fare collection system, a ticket issuing machine having an intermittently, non-reversible, rotatable member having a plurality of printing characters or marks thereon arranged in groups or rows to form two divisions; the characters or marks of one division being a duplication of the characters or marks of the other division, but arranged in reversed order relatively thereto; the number of characters or marks in the groups or rows of each division retrogressively diminishing as said rotatable member is progressively rotated; and devices whereby an imprint indicative of a determined fare or fares with respect to a destination point or points is obtained singularly or collectively from the characters or marks of the groups of either division when the same are in printing relation with said devices.

11. In a ticket system for a multiple stage fare collection system, means comprising an intermittently operating member having printing devices arranged in a determined order according to fare points and respective fare values and capable of selective setting for non-selective operation to print indicating matter on a ticket.

12. In a multiple stage fare ticket system, means comprising an intermittently non-returnable operating member having printing devices arranged in determined order with respect to the stage points and adapted to be a ticket having defined spaces corresponding with the stage points; means for selectively and intermittently turning and indicating the position of said operating member; and means operative non-selectively for producing an imprint from one or more of said printing devices.

13. In a ticket system for a passenger service system having multiple stage fare points, means comprising an intermittently non-returnable operating member having printing devices arranged in a determined order with respect to said stage fare points and adapted to be a ticket having defined spaces or indications corresponding to said fare points; means for effecting progressive setting of said operating member; and means for producing an imprint from any selected printing device.

14. In a stage fare ticket system, a ticket issuing machine employing a blank ticket strip and being provided with means comprising a non-returnable progressive setting member having thereon printing devices representing both fare points and respective fare values arranged in a determined order: and means for effecting a selected imprint from one or more of said printing devices on a ticket taken from said ticket strip.

15. A multiple stage fare ticket machine having ticket printing mechanism capable of selective setting; non-selective operating means for effecting a single or repeated action of said mechanism to produce one or more tickets bearing thereon printed matter indicating variable fares between changing fare points: and said printing mechanism comprising a printing member having thereon characters representing fare indications arranged in a determined graded order relatively to said fare points.

16. A multiple stage fare ticket machine having ticket printing mechanism capable of selective setting: non-selective operating means for effecting a single or repeated action of said mechanism to produce one or more tickets bearing thereon printed matter indicating variable fares between changing fare points: said printing mechanism comprising a printing member having thereon characters representing fare indications arranged in a determined graded order relatively to said fare points: and said printing member consisting of a rotating drum with printing characters thereon arranged in divisions subdivided into groups whereby direction of destination is indicated besides indication of fare valuation to or between one or more fare points.

17. A multiple stage fare ticket machine having ticket printing mechanism capable of selective setting: non-selective operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; and said printing member being capable of moving progressively and in one direction only.

18. A multiple stage fare ticket machine having ticket printing mechanism capable of selective setting; non-selective operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points, and said printing member being provided with means for progressively setting the same and indicating its set position.

19. A multiple stage fare ticket machine having ticket printing mechanism capable of selective setting; non-selective operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points, and said printing mechanism comprising a platen capable of being brought into printing relation with a printing character or characters set into operative relation therewith.

20. A multiple stage fare ticket machine having ticket printing mechanism capable of selective setting; non-selective operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points, and said printing mechanism having a device co-operatively associated therewith for audibly signalling every printing operation.

21. A multiple stage fare ticket machine having ticket printing mechanism capable of selective setting; non-selective operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points, and said printing mechanism having a device co-operatively associated therewith for counting every printing operation.

22. A multiple stage fare ticket machine having ticket printing mechanism capable of selective setting; ticket feeding mechanism; ticket severing mechanism; non-selective operating means for effecting single or repeated action of all of said mechanism in determined sequence to produce one or more tickets bearing thereon printed matter indicating changing fares between changing fare points.

23. A multiple stage fare ticket machine having ticket printing mechanism capable of selective setting; ticket feeding mechanism; ticket severing mechanism; non-selective operating means for effecting single or repeated action of all of said mechanism in determined sequence to produce one or more tickets bearing thereon printed matter indicating changing fares between changing fare points; and an operating member for said mechanisms having one part capable of independent initial movement relatively to the other part to effect separately the printing operation and by continued movement of the first part effecting movement of the other part to effect the ticket feeding and severing operation.

24. A multiple stage fare ticket machine having ticket printing mechanism capable of selective setting; ticket feeding mechanism; ticket severing mechanism; non-selective operating means for effecting single or repeated action of all of said mechanism in determined sequence to produce one or more tickets bearing thereon printed matter indicating changing fares between changing fare points; and said feeding mechanism having ticket feeding rollers comprising a driven roller and a tension roller on which pressure is imparted by a bent leaf spring interposed between the shaft of said tension roller and a fixed point.

25. A multiple stage fare ticket machine having ticket printing mechanism capable of selective setting; ticket feeding mechanism; ticket severing mechanism; non-selective operating means for effecting single or repeated action of all of said mechanism in determined sequence to produce one or more tickets bearing thereon printed matter indicating changing fares between changing fare points; and ticket severing mechanism operated at the final movement of said operating means and said severing mechanism comprising a saw tooth cutting blade to which an oscillatory movement is imparted.

26. A multiple stage fare ticket machine having ticket printing mechanism capable of selective setting; ticket feeding mechanism; ticket severing mechanism; non-selective operating means for effecting single or repeated action of all of said mechanism in determined sequence to produce one or more tickets bearing thereon printed matter indicating changing fares between changing fare points; and a casing in which all the mechanism is enclosed; with the respective means for setting and operating said mechanism extending from said casing; and means on said casing for clamping the machine to a stationary point.

Signed at North Haven, in the county of New Haven and State of Connecticut this 14th day of August A. D. 1919.

ARNOLD J. TANNER.